US 11,486,308 B2

(12) United States Patent
Chen et al.

(10) Patent No.: US 11,486,308 B2
(45) Date of Patent: Nov. 1, 2022

(54) ENGINE ENCLOSURE AIR INLET SECTION

(71) Applicant: Rohr, Inc., Chula Vista, CA (US)

(72) Inventors: Jason K. Chen, San Diego, CA (US); Phillip Andelson, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 1135 days.

(21) Appl. No.: 16/026,464

(22) Filed: Jul. 3, 2018

(65) Prior Publication Data
US 2020/0011243 A1   Jan. 9, 2020

(51) Int. Cl.
*F02C 7/047* (2006.01)
*B64D 29/00* (2006.01)
*B64D 33/02* (2006.01)

(52) U.S. Cl.
CPC .............. *F02C 7/047* (2013.01); *B64D 29/00* (2013.01); *B64D 33/02* (2013.01); *B64D 2033/0233* (2013.01); *B64D 2033/0286* (2013.01); *F05D 2260/20* (2013.01)

(58) Field of Classification Search
CPC .... B64D 2033/0233; B64D 2033/0286; B64D 29/00; F02C 7/047
See application file for complete search history.

(56) References Cited

U.S. PATENT DOCUMENTS

| | | | |
|---|---|---|---|
| 5,088,277 A | 2/1992 | Schulze | |
| 6,267,328 B1 | 7/2001 | Vest | |
| 8,197,191 B2 * | 6/2012 | Binks | B64D 29/06 415/214.1 |
| 8,757,540 B2 | 6/2014 | Olver et al. | |
| 2005/0006529 A1 | 1/2005 | Moe et al. | |
| 2010/0163677 A1 | 7/2010 | Rocklin et al. | |
| 2010/0199629 A1 | 8/2010 | Chene | |
| 2010/0260602 A1 * | 10/2010 | Binks | B64D 33/02 415/214.1 |
| 2016/0356180 A1 | 12/2016 | Bol | |
| 2020/0290747 A1 * | 9/2020 | Delsol | B64C 3/28 |
| 2022/0041296 A1 * | 2/2022 | Ferrier | B64D 29/06 |

OTHER PUBLICATIONS

EP search report for EP19183463.9 dated Nov. 18, 2019.

* cited by examiner

*Primary Examiner* — Richard R. Green
(74) *Attorney, Agent, or Firm* — Getz Balich LLC

(57) ABSTRACT

An air inlet section for an enclosure for an aircraft engine is provided that includes an inner barrel panel, an outer barrel panel, a lipskin and a forward bulkhead. The lipskin extends between an inner barrel end and an outer barrel end. The inner barrel end is disposed proximate the forward end of the inner barrel panel and the outer barrel end is disposed proximate the forward end of the outer barrel panel. The forward bulkhead has a panel that extends between an outer radial end and an inner radial end. The inner barrel panel, the outer barrel panel, and the lipskin define an interior annular region, and the forward bulkhead defines a sub-portion of interior annular region. The outer radial end of the forward bulkhead panel is disposed forward of the inner radial end of the forward bulkhead panel.

15 Claims, 3 Drawing Sheets

ENGINE ENCLOSURE AIR INLET SECTION

BACKGROUND

The present invention relates generally to air inlet bodies for aircraft engines, and in particular to structural elements for a gas turbine engine air inlet body.

Aircraft engines are typically disposed within a structural aerodynamic enclosure. In instances where the gas turbine engine is mounted on the wing of the aircraft, the enclosure may be referred to as a nacelle. Regardless of where the enclosure is disposed on the aircraft, it will include an air inlet section that is disposed forward of the engine fan section. The air inlet section extends circumferentially and may be described as having a lipskin, an inner barrel panel, and an outer barrel panel. The inner barrel panel forms at least part of the interior passageway through which air enters the engine. The outer barrel panel forms at least a part of the exterior of the structural aerodynamic enclosure of the gas turbine engine. The lipskin extends between the inner barrel and the outer barrel, and is arcuately shaped (e.g., elliptically shaped, oval shaped, U-shaped, etc.) to provide the leading edge of the air inlet section.

The potential for accumulation of ice on the air inlet section is an issue that must be addressed. Any accumulated ice adds undesirable weight, can change the geometry of the air inlet section, disrupt airflow, create air flow patterns that may adversely affect engine performance, and/or dislodge and be ingested into the engine. One known technique for addressing this issue is to provide air at an elevated temperature into a region of the air inlet section proximate the region likely to experience ice accumulation. Existing systems that use hot air to mitigate ice accumulation are moderately successful.

What is needed is an air inlet section with an improved ability to mitigate ice accumulation, and one that operates with greater efficiency.

SUMMARY

According to an aspect of the present disclosure, an air inlet section for an enclosure for an aircraft engine is provided. The air inlet section includes an inner barrel panel, an outer barrel panel, a lipskin and a forward bulkhead. The inner barrel panel has a forward end and the outer barrel panel has a forward end. The lipskin has an interior surface and an exterior surface. The interior surface and the exterior surface oppose one another, and the lipskin extends between an inner barrel end and an outer barrel end. The inner barrel end is disposed proximate the forward end of the inner barrel panel and the outer barrel end is disposed proximate the forward end of the outer barrel panel. The forward bulkhead has a panel that extends between an outer radial end and an inner radial end. The air inlet section is configured as an annular structure that extends circumferentially around an axially extending centerline, with the inner barrel panel disposed radially inside of and separated from the outer barrel panel. The inner barrel panel, the outer barrel panel, and the lip skin define an interior annular region, and the forward bulkhead defines a sub-portion of interior annular region. The outer radial end of the forward bulkhead panel is disposed forward of the inner radial end of the forward bulkhead panel.

According to another aspect of the present disclosure, an aircraft engine enclosure is provided. The enclosure includes an air inlet section as described above and an anti-icing device. The anti-icing device is configured to provide a flow path for air to the interior annular region sub-portion.

In any of the aspects or embodiments described above and herein, at least a portion of the forward bulkhead panel may be canted relative to the axially extending centerline, and the portion extends around substantially an entirety of a circumference of the air inlet section. In some embodiments, the portion may be discontinuous.

In any of the aspects or embodiments described above and herein, the forward bulkhead panel extends substantially along a dissecting line, and the canted portion of the forward bulkhead is disposed at a cant angle of at least about ten degrees (10°) relative to the axially extending centerline.

In any of the aspects or embodiments described above and herein the cant angle is in a range of about ten degrees (10°) and an angle associated with the dissecting line intersecting with a forward most point of the lipskin.

In any of the aspects or embodiments described above and herein, the forward bulkhead panel may include at least one panel segment that is disposed at an angle relative to the axially extending centerline less than the cant angle.

In any of the aspects or embodiments described above and herein, the inner radial end and the outer radial end of the forward bulkhead may be contiguous with the interior surface of the lip skin.

In any of the aspects or embodiments described above and herein, the inner radial end of the forward bulkhead may be contiguous with an interior surface of the inner barrel panel.

In any of the aspects or embodiments described above and herein, the outer radial end of the forward bulkhead may be contiguous with an interior surface of the outer barrel panel.

In any of the aspects or embodiments described above and herein, the forward bulkhead panel may include an outer radial end flange extending outwardly from the outer radial end, and an inner radial end flange extending outwardly from the inner radial end.

In any of the aspects or embodiments described above and herein, the lipskin may include a forward most point, a first segment, and a second segment. The first segment is disposed on an inner barrel side of the forward most point and the second segment is disposed on an outer barrel side of the forward most point. The first segment is greater than the second segment.

In any of the aspects or embodiments described above and herein, the forward bulkhead panel may include at least one forward panel bulkhead panel segment that is disposed at an angle relative to the axially extending centerline less than the cant angle, and the anti-icing device includes a fluid conduit that extends through at least a portion of the interior annular region, and provides a fluid passage through the forward panel bulkhead panel segment disposed at an angle relative to the axially extending centerline less than the cant angle and into the interior annular region sub-portion.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, material, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1:
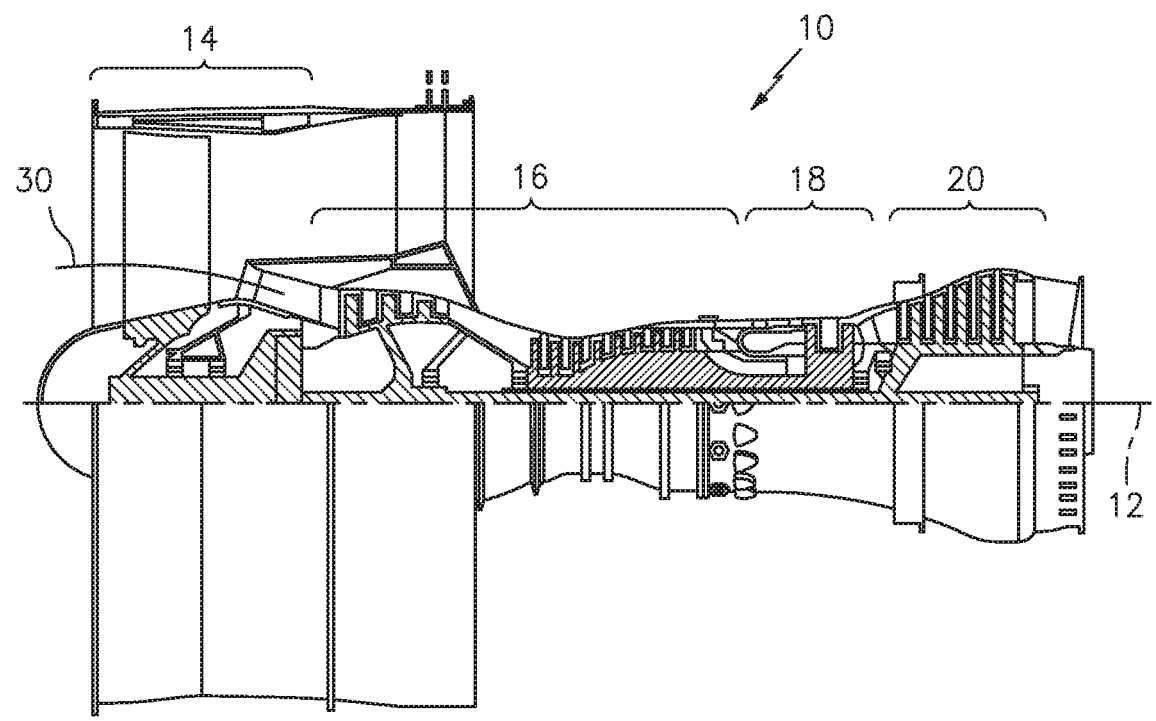
FIG. 1 is a diagrammatic partially sectioned view of a turbofan type gas turbine engine.

FIG. 1 is an axial sectional diagrammatic view of a turbofan type gas turbine engine 10 including a longitudinal engine axis 12, a fan section 14, a compressor section 16, a combustor section 18, and a turbine section 20. The compressor section 16 typically includes a low pressure compressor and a high pressure compressor. The turbine section 20 typically includes a low pressure turbine and a high pressure turbine. A low speed spool typically connects the fan section 14 and the low pressure compressor to the low pressure turbine. In some embodiments, the low speed spool may be connected to the fan section 14 through a speed change mechanism (e.g., a geared architecture that drives the fan section 14 at a lower rotational speed than the low speed spool). A high speed spool connects the high pressure compressor to the high pressure turbine. The combustor section 18 is disposed between the high pressure compressor and the high pressure turbine. The low speed spool and the high speed spools are typically concentric and rotate about the engine longitudinal axis 12.

During operation of engine 10, a gas stream 30 (initially comprised of air) is drawn into the front of engine 10 by rotation of fan blades disposed within the fan section 14. The fan section 14 directs a portion of the gas stream 30 into the compressor section 16. In those instances wherein the gas turbine engine is a turbojet type gas turbine engine, the gas stream may be drawn directly into the compressor. The gas stream 30 is successively compressed (e.g., elevated in temperature and pressure) through stages of the compressor section 16 and directed into the combustor section 18. In combustor section 18, the now-compressed gas stream 30 is mixed with fuel and ignited. The gas and fuel mixture ignited in the combustor section 18 is directed into the turbine section 20 in which the gas stream (now including air, combustion products, etc.) is successively expanded. The high pressure turbine extracts energy from the gas stream to power the high pressure compressor via the high speed spool. The low pressure turbine extracts energy from the gas stream to power the fan section 14 and the compressor section 16 via the low speed spool. The gas stream 30 subsequently exits the engine 10, producing useful thrust for engine 10. The gas turbine engine 10 described above and shown in FIG. 1 is a non-limiting example of a turbofan type gas turbine engine that may be used with aspects of the present disclosure; e.g., the present disclosure has applicability to other types of gas turbine engines such as turbojet type gas turbine engines, etc.

Figure 2:
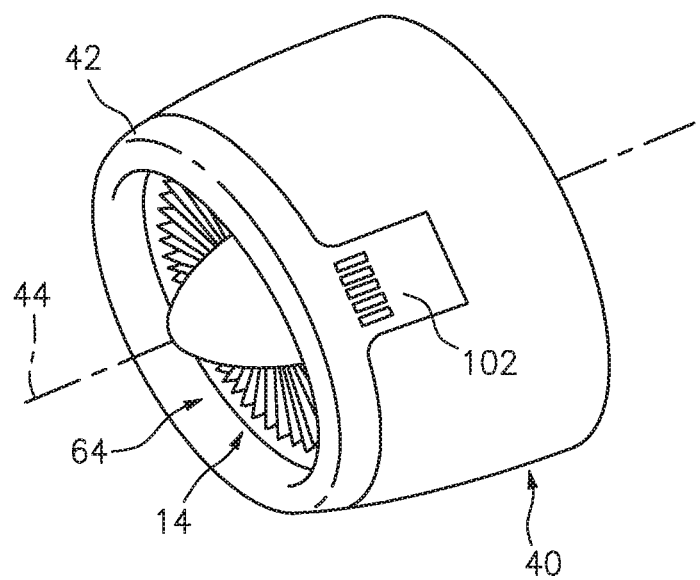
FIG. 2 is a partial perspective view of an aircraft engine disposed within a structural aerodynamic enclosure.

FIG. 2 shows a partial perspective view of an aircraft engine 10 disposed within an engine enclosure 40 (e.g., a nacelle) that includes an air inlet section 42 disposed forward of the engine fan section 14. As used herein, the terms "forward" and "aft" are defined as follows: forward is defined as being upstream of aft; e.g., air enters the forward located fan section 14 of a gas turbine engine 10 and exits aft of the turbine section 20. The air inlet section 42 extends circumferentially entirely around an axially extending centerline 44, which axially extending centerline 44 may coincide with the longitudinal engine axis 12 shown in FIG. 1. The term "circumferentially entirely around an axially extending centerline 44" means that the air inlet section 42 is present at every circumferential position around the axially extending centerline 44. In some embodiments, the air inlet section 42 may be symmetrical about the axially extending centerline 44 (e.g., circular) and in other embodiments the air inlet section 42 may not be completely symmetrical about the axially extending centerline 44.

Figure 3:
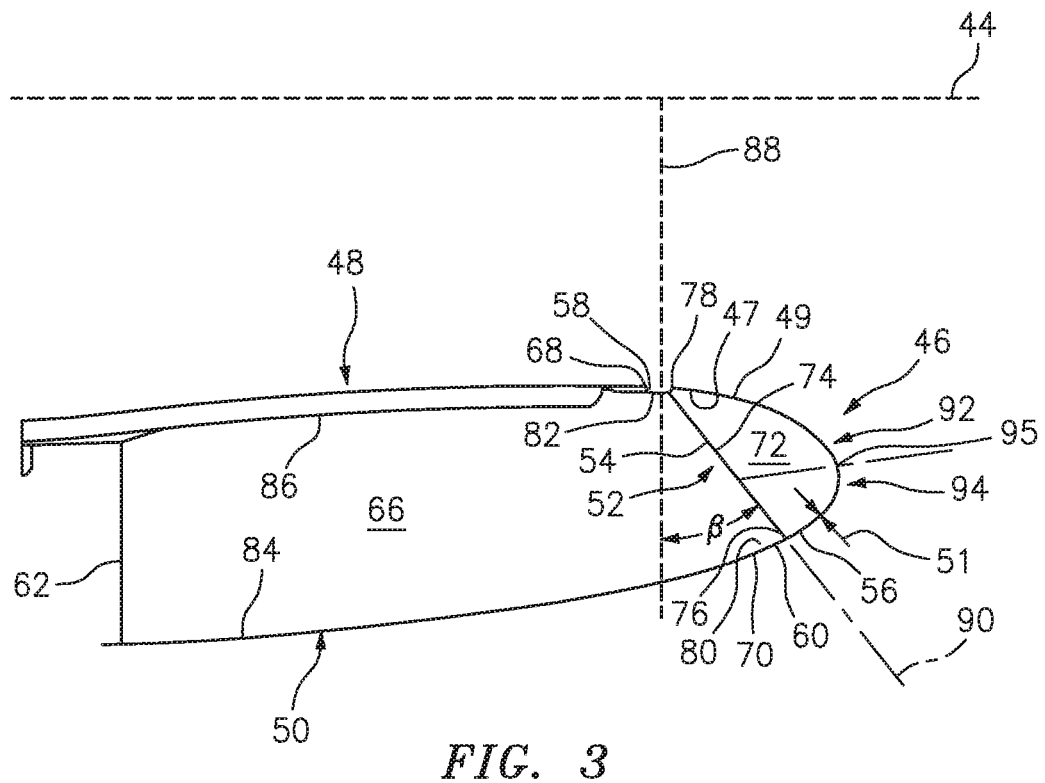
FIG. 3 is a diagrammatic cross-sectional view of a portion of an embodiment of a circumferentially extending air inlet section.
Figure 4:
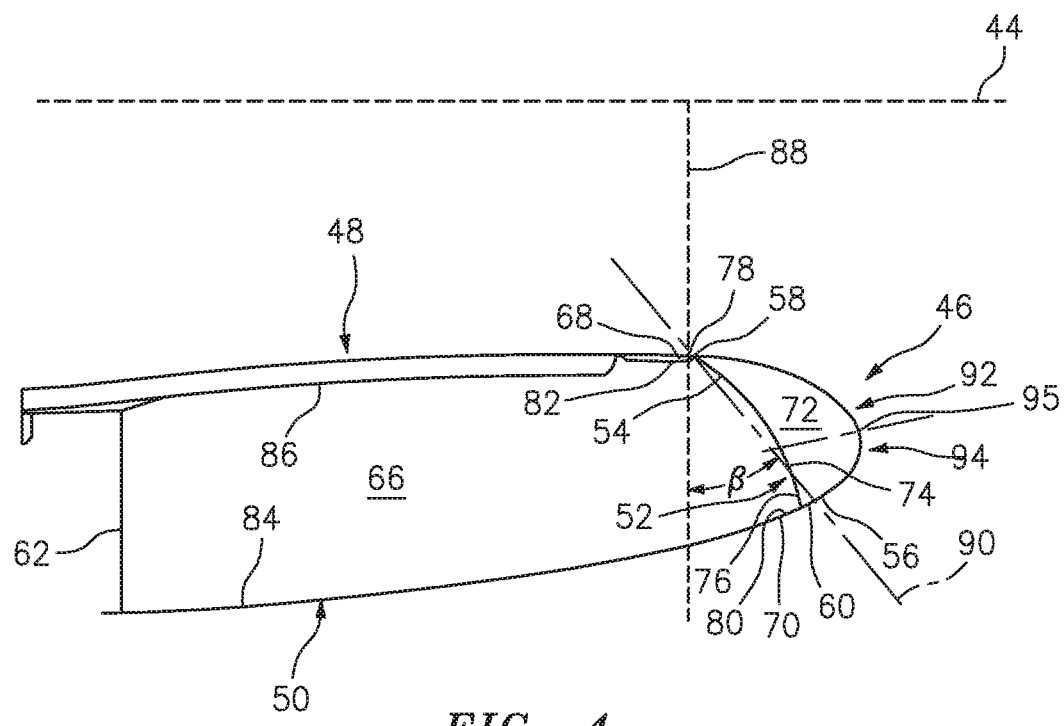
FIG. 4 is a diagrammatic cross-sectional view of a portion of an embodiment of a circumferentially extending air inlet section.
Figure 5:
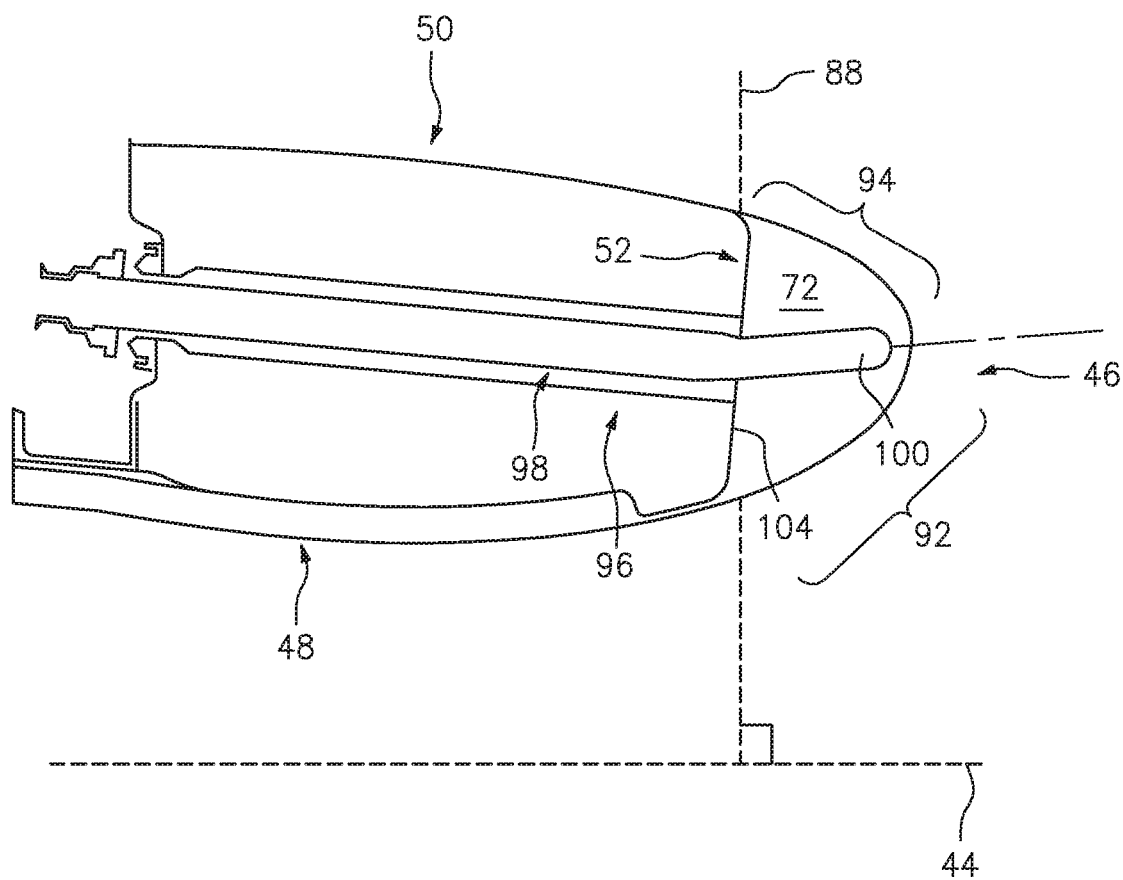
FIG. 5 is a diagrammatic cross-sectional view of a portion of an embodiment of a circumferentially extending air inlet section.

FIGS. 3-5 illustrate partial cross-sectional views of the circumferentially extending air inlet section 42. The air inlet section 42 includes a lipskin 46, an inner barrel panel 48, an outer barrel panel 50, and a forward bulkhead 52. The forward bulkhead 52 may be described as having an interior surface 54 and an opposing exterior surface 56 that extend between an inner barrel end 58 and an outer barrel end 60. In some embodiments, the air inlet section 42 may also include an aft bulkhead 62. The inner barrel panel 48 forms at least part of an interior passageway 64 through which air enters the engine 10. The outer barrel panel 50 forms at least a part of the exterior of the engine enclosure 40.

The lipskin 46 extends between the inner barrel panel 48 and the outer barrel panel 50. The lip skin 46 has an interior surface 47 and an exterior surface 49, and a thickness 51 that extends there between (see FIG. 3). The lipskin 46 is solid between the interior surface 47 and the exterior surface 49. The inner barrel panel 48, the outer barrel panel 50, and the lipskin 46 define an annular interior region 66 of the engine enclosure 40. A first end 58 (which may be referred to as an "inner barrel end") of the lipskin 46 is disposed proximate a forward end 68 of the inner barrel panel 48 and a second end 60 (which may be referred to as an "outer barrel end") of the lipskin 46 is disposed proximate a forward end 70 of the outer barrel panel 50. The lipskin 46 may be attached to the outer barrel panel 50 on one end and the inner barrel panel 48 on the opposite end. The lipskin 46 is arcuately shaped (e.g., elliptically shaped, oval shaped, U-shaped, etc.) to provide the forward leading edge of the air inlet section 42. In the embodiment shown in FIGS. 3-5, the lipskin 46 and the forward bulkhead 52 define a sub-portion 72 of the annular interior region 66 of the engine enclosure 40 located within the air inlet section 42, sometimes referred to as a "D-duct" 72. The interior surface 47 of the lipskin 46 is contiguous with D-duct cavity 72.

The forward bulkhead 52 includes a panel 74 that extends between an outer radial end 76 and an inner radial end 78. In some embodiments, the forward bulkhead 52 may be configured to have thermal insulating properties, or may include an insulation layer affixed thereto. In some embodiments (e.g., see FIG. 3) the forward bulkhead 52 may include an outer radial end flange 80 extending outwardly from the outer radial end 76, and an inner radial end flange 82 extending outwardly from the inner radial end 78. Each of the aforesaid flanges 80, 82 may extend around the circumferential entirety of the air inlet section 42, or comprise a plurality of flange elements that are positioned (e.g., spaced at particular intervals) around the circumference of the air inlet section 42. The aforesaid flanges 80, 82 facilitate attachment and positioning of the forward bulkhead 52. The forward bulkhead outer radial end 76 may be contiguous with the interior surface 47 of the lip skin 46, adjacent the outer barrel panel 50 or contiguous with an interior surface 84 of the outer barrel panel 50. The forward bulkhead inner radial end 78 may be contiguous with the interior surface 47 of the lipskin 46, adjacent the inner barrel panel 48 or contiguous with an interior surface 86 of the inner barrel panel 48. The forward bulkhead outer radial end 76 (and/or the outer radial end flange 80) may be attached to the lipskin 46 or the outer barrel panel 50 or both, and the forward bulkhead inner radial end 78 (and/or the inner radial end flange 82) may be attached to the lipskin 46 or the inner barrel panel 48 or both.

The forward bulkhead 52 is disposed within the air inlet section 42 so that the outer radial end 76 along substantially the entire circumference of the air inlet section 42 is positioned forward of the inner radial end 78. In this manner, at least a substantial portion of the forward bulkhead 52 may be described as being "canted" (i.e., disposed at a non-perpendicular "cant" angle β) relative to a perpendicular line 88 extending from the axially extending centerline 44 of the air inlet section 42; e.g., the cant angle is disposed between a dissecting line 90 that resides within the plane of the forward bulkhead 52 and the perpendicular line 88 (lines 88 and 90 reside within a plane that is perpendicular with the forward bulkhead surface at the point of measurement). The forward bulkhead 52 is diagrammatically shown in FIG. 3 as canted and having a panel 74 that extends along a straight line. The present disclosure is not limited to a forward bulkhead panel 74 extending along a straight line. For example, in FIG. 4, the panel 74 of the forward bulkhead 52 has a minor curvature. In such an embodiment, a dissecting line 90 representative of the average position of the forward bulkhead panel 74 may be used to establish the degree to which the forward bulkhead panel 74 is canted. The lipskin 46 may be described as having a first segment 92 disposed on an inner barrel side of the D-duct 72, and a second segment 94 disposed on an outer barrel side of the D-duct 72. The forward most point 95 (sometimes referred to as the "highlight") of the lipskin 46 marks the intersection of the lipskin first segment 92 and the lipskin second segment 94; i.e., the lipskin first segment 92 is disposed on one side of the forward most point 95 and the lipskin second segment 94 is disposed on the opposite side of the forward most point 95. The lipskin first segment 92 is greater in length than the lipskin second segment 94. The cant angle β is in the range of about ten degrees (10°) to whatever angle exists when the forward bulkhead outer radial end 76 is disposed at the forward most point 95 of the lipskin 46; i.e., the dissecting line 90 intersects the forward most point 95 of the lip skin 46.

In some embodiments, the present disclosure may be configured for use with or include an anti-icing device 96 (e.g., see FIG. 5) that is configured to provide air at an elevated temperature and pressure (referred to hereinafter as "heating air") into the D-duct 72; e.g., in contact with the interior surface 47 of the lipskin 46. For example, in FIG. 5, the anti-icing device 96 includes one or more conduits 98 configured to deliver heating air into the D-duct 72. The heating air may, for example, be bled off of a compressor stage. The present disclosure is not limited to any particular source of heating air. In the example shown in FIG. 5, the conduit(s) 98 includes a nozzle 100 (disposed within the D-duct 72) configured to create a swirl of heated air within the D-duct 72. In some embodiments, the anti-icing device 96 may include a manifold tube (not shown) that extends circumferentially within the D-duct 72 instead of the aforesaid nozzle 100, which manifold includes a plurality of impingement apertures. Heating air passed through the conduit 98 and into the manifold and bleeds out of the manifold, typically impinging on the interior surface of the lipskin 46. The anti-icing device 96 may include one or more exhaust vents 102 (e.g., see FIG. 2) configured to allow the heating air to escape the D-duct 72 and into the environment outside of the air inlet section 42. The present disclosure is not limited to any particular exhaust vent configuration, or any particular anti-icing device.

As indicated above, at least a substantial portion of the forward bulkhead 52 is canted within the air inlet section 42 so that the outer radial end 76 of the forward bulkhead 52 is positioned forward of the inner radial end 78 for substantially the entire circumference of the air inlet section 42. In some embodiments, a segment 104 (e.g., a relatively minor circumferential portion) of the forward bulkhead 52 aligned with the conduit 98 of the anti-icing device 96 may be disposed at an angle other than the angle at which the remainder of the forward bulkhead 52 is canted (i.e., angle β). For example, the segment 104 of the forward bulkhead 52 aligned with the conduit 98 of the anti-icing device 96 may be canted at a lesser angle or may be disposed substantially perpendicular to the axially extending centerline 44 of the air inlet section 42. In the embodiment shown in FIG. 5, for example, the segment 104 of the forward bulkhead 52 aligned with the conduit 98 of the anti-icing device 96 is disposed substantially perpendicular (e.g., substantially co-linear with perpendicular line 88) to the axially extending centerline 44 of the air inlet section 42. Disposing this segment 104 of the forward bulkhead 52 substantially perpendicular, facilitates the positioning of the swirl nozzle 100 within the D-duct 72. Similarly, in some embodiments the segment of the forward bulkhead 52 aligned with the exhaust vent 102 of the anti-icing device 96 may be disposed substantially perpendicular to the axially extending centerline 44 of the air inlet section 42. In these embodiments, the segment 104 of the forward bulkhead 52 disposed at a lesser angle than the cant angle relative to a line 88 extending perpendicular to the axially extending centerline 44 of the air inlet section 42 represent a relative small extent of the forward bulkhead 52 circumference; e.g., typically just enough to accommodate a nozzle 100 and/or an exhaust vent 102.

The canted forward bulkhead 52 of the present disclosure creates a D-duct 72 that has less internal annular volume than similar prior art structures of which we are aware, and also permits the use of a lipskin 46 that is dominated towards the inner barrel side; e.g., the lipskin first segment 92 is greater in length than the lip skin second segment 94. As a result, the heating air is in contact with less lipskin 46 surface overall, and a greater percentage of that lipskin 46 surface is oriented toward the inner barrel side. As a result, a greater percentage of the heat produced within the D-duct 72 is oriented on the inner barrel side which improves the ability of the anti-icing device 96 to mitigate potential ice accumulation on the inner barrel side of the lipskin 46. This aspect of the present disclosure can avoid significant heat loss in regions where icing mitigation is less important or not required. For example, heating of the lipskin 46 region adjacent the outer barrel panel 50 (e.g., see lipskin segment 94 in FIGS. 3 and 4) is typically not required. Thermal energy used in heating that region therefore does not provide a beneficial result, and actually decreases the ability of the heating air to heat the lipskin 46 region adjacent the inner barrel region (e.g., by decreasing the temperature of the heating air). In addition, lipskins 46 are typically made from material (e.g., aluminum, steel, etc.) having a volumetric weight that is greater the volumetric weight of the outer barrel panel 50 material (e.g., composites, etc.). The canted forward bulkhead 52 of the present disclosure permits the air inlet section 42 to be configured so that the intersection of the outer barrel panel 50 and the lip skin 46 is moved forward of prior art designs of which we are aware. Hence, the length of the lipskin 46 extending between the intersection of the outer barrel panel 50 and the inner barrel panel 48 is reduced, resulting in a smaller, lighter lipskin 46; e.g., a portion of the air inlet section 42 formed by the lipskin 46 in prior art designs is formed by the lighter outer barrel panel 50 in the present disclosure.

Although the present invention has been described with reference to particular embodiments, workers skilled in the art will recognize that changes may be made in form and detail without departing from the spirit and scope of the invention.

What is claimed is:

1. An air inlet section for an enclosure for an aircraft engine, comprising:
   an inner barrel panel having a forward end;
   an outer barrel panel having a forward end;
   a lip skin having an interior surface and an exterior surface, wherein the interior surface and the exterior surface oppose one another, the lipskin extending between an inner barrel end and an outer barrel end, wherein the inner barrel end is disposed proximate the forward end of the inner barrel panel and the outer barrel end is disposed proximate the forward end of the outer barrel panel; and
   a forward bulkhead having a panel that extends between an outer radial end and an inner radial end;
   wherein the air inlet section is configured as an annular structure that extends circumferentially around an axially extending centerline, with the inner barrel panel disposed radially inside of and separated from the outer barrel panel, and the inner barrel panel, the outer barrel panel, and the lipskin define an interior annular region, and the forward bulkhead defines a sub-portion of interior annular region;
   wherein the outer radial end of the forward bulkhead panel is disposed forward of the inner radial end of the forward bulkhead panel; and
   wherein a dissecting line is representative of an average position of the forward bulkhead panel, wherein a first circumferential portion of the forward bulkhead panel is canted at a cant angle defined between a perpendicular line extending from the axially extending centerline and the dissecting line, and wherein the cant angle is at least ten degrees (10°), wherein a second circumferential portion of the forward bulkhead panel is disposed at an angle relative to the axially extending centerline which is less than the cant angle, and wherein the first circumferential portion is circumferentially adjacent the second circumferential portion and each of the first circumferential portion and the second circumferential portion extend from the inner radial end to the outer radial end.

2. The air inlet of claim 1, wherein the portion is discontinuous.

3. The air inlet section of claim 1, wherein the cant angle is in a range of about ten degrees)(10°) and an angle associated with the dissecting line intersecting with a forward most point of the lip skin.

4. The air inlet section of claim 1, wherein the inner radial end and the outer radial end of the forward bulkhead are contiguous with the interior surface of the lipskin.

5. The air inlet section of claim 1, wherein the inner radial end of the forward bulkhead is contiguous with an interior surface of the inner barrel panel.

6. The air inlet section of claim 1, wherein the outer radial end of the forward bulkhead is contiguous with an interior surface of the outer barrel panel.

7. The air inlet section of claim 1, wherein the forward bulkhead panel includes an outer radial end flange extending outwardly from the outer radial end, and an inner radial end flange extending outwardly from the inner radial end.

8. The air inlet section of claim 1, wherein the lip skin includes a forward most point, a first segment, and a second segment, wherein the first segment is disposed on an inner barrel side of the forward most point and the second segment is disposed on an outer barrel side of the forward most point, and the first segment is greater than the second segment.

9. An aircraft engine enclosure, comprising:
   an air inlet section having:
   an inner barrel panel having a forward end;
   an outer barrel panel having a forward end;
   a lip skin having an interior surface and an exterior surface, wherein the interior surface and the exterior surface oppose one another and extend between an inner barrel end and an outer barrel end, wherein the inner barrel end is disposed proximate the forward end of the inner barrel panel and the outer barrel end is disposed proximate the forward end of the outer barrel panel; and
   a forward bulkhead having a panel that extends between an outer radial end and an inner radial end;
   wherein the air inlet section is configured as an annular structure that extends circumferentially around an axially extending centerline, with the inner barrel panel disposed radially inside of and separated from the outer barrel panel, and the inner barrel panel, the outer barrel panel, and the lip skin define an interior annular region, and the forward bulkhead defines a sub-portion of interior annular region;
   wherein the outer radial end of the forward bulkhead panel is disposed forward of the inner radial end of the forward bulkhead panel, wherein a first circumferential portion of the forward bulkhead panel is canted at a cant angle relative to a perpendicular line extending from the axially extending centerline, wherein a second circumferential portion of the forward bulkhead panel is disposed at an angle relative to the axially extending centerline which is less than the cant angle, and wherein each of the first circumferential portion and the second circumferential portion extend from the inner radial end to the outer radial end; and
   an anti-icing device configured to provide a flow path for air to the interior annular region sub-portion, the anti-icing device comprising a fluid conduit extending through at least a portion of the interior annular region, the fluid conduit comprising a nozzle which extends through the second circumferential portion of the forward bulkhead panel into the sub-portion of the interior annular region.

10. The engine enclosure of claim 9, wherein the first circumferential portion of the forward bulkhead panel extends substantially along a dissecting line which is disposed at a cant angle of at least ten degrees (10°) relative to the axially extending centerline.

11. The engine enclosure of claim 10, wherein the cant angle is in a range of about ten degrees (10°) and an angle associated with the dissecting line intersecting with a forward most point of the lipskin.

12. The engine enclosure of claim 9, wherein the inner radial end and the outer radial end of the forward bulkhead are contiguous with the interior surface of the lipskin.

13. The engine enclosure of claim 9, wherein the inner radial end of the forward bulkhead is contiguous with an interior surface of the inner barrel panel.

14. The engine enclosure of claim 9, wherein the outer radial end of the forward bulkhead is contiguous with an interior surface of the outer barrel panel.

15. The engine enclosure of claim 9, wherein the air inlet section includes one or more exhaust vents extending between the sub-portion and an exterior of the air inlet section, the one or more exhaust vents circumferentially aligned with the second circumferential portion.

\* \* \* \* \*